United States Patent [19]

Gupta et al.

[11] Patent Number: 4,564,496

[45] Date of Patent: Jan. 14, 1986

[54] METHOD OF MAKING POROUS SILICON CARBIDE BODIES

[75] Inventors: Ashok K. Gupta; Ernö Gyarmati, both of Jülich; Hermann Kreutz, Monchen-Gladbach; Rudolf Münzer, Alsdorf; Aristides Naoumidis; Hubertus Nickel, both of Jülich, all of Fed. Rep. of Germany

[73] Assignee: Kernforschungsanlage Jülich GmbH, Jülich, Fed. Rep. of Germany

[21] Appl. No.: 742,654

[22] Filed: Jun. 10, 1985

Related U.S. Application Data

[63] Continuation of Ser. No. 352,006, Feb. 24, 1982, abandoned.

[30] Foreign Application Priority Data

Mar. 5, 1981 [DE] Fed. Rep. of Germany ....... 3108266

[51] Int. Cl.$^4$ ............................................. C01B 31/36
[52] U.S. Cl. ....................... 264/44; 264/49; 264/66; 264/82; 264/129; 423/345; 423/346; 501/88; 501/90
[58] Field of Search .................. 423/345, 346; 501/88, 501/90; 264/44, 49, 66, 82, 129

[56] References Cited

U.S. PATENT DOCUMENTS

| | | | |
|---|---|---|---|
| 2,691,605 | 10/1954 | Hediger | 423/346 X |
| 3,100,688 | 8/1983 | Dess . | |
| 3,205,043 | 9/1965 | Taylor | 423/345 |
| 3,436,793 | 10/1970 | Norman . | |
| 4,067,955 | 1/1978 | Noakes | 423/345 |
| 4,301,132 | 11/1981 | Kennedy | 423/345 |
| 4,415,632 | 11/1983 | Luhleich . | |

FOREIGN PATENT DOCUMENTS

| | | |
|---|---|---|
| 0011841 | 11/1979 | European Pat. Off. . |
| 1254520 | 11/1967 | Fed. Rep. of Germany . |
| 2232719 | 1/1974 | Fed. Rep. of Germany . |
| 2544288 | 4/1976 | Fed. Rep. of Germany . |
| 828211 | 2/1960 | United Kingdom . |
| 1328249 | 8/1973 | United Kingdom . |

OTHER PUBLICATIONS

Singer Text, pp. 521–522, (Industrial Ceramics).

*Primary Examiner*—Jack Cooper
*Attorney, Agent, or Firm*—Frishauf, Holtz, Goodman & Woodward

[57] ABSTRACT

Porous silicon carbide bodies are obtained by starting with a powder of particle size falling within a single sieve mesh range fraction and consisting either entirely of carbon particles or a mixture of carbon and silicon carbide particles of the same mesh fraction is mixed or coated with 15 to 30% by weight of a binder, moulded to shape, warmed in the temperature range from 40° to 200° C. to vaporize volatile material and then coked at a temperature rising to 850° C. Then it is siliconized by raising the temperature to the range from 1650° to 1950° C. with gaseous silicon or impregnated with silicon by dipping the body into a silicon melt and convert it to carbide, with the excess silicon thereafter being removed by vaporizing out or by boiling in lye. Sieve mesh fractions in the region of a few hundred μm are preferred, and the density of the porous body after pressing but before siliconizing should lie in the neighborhood of 0.6 to 0.7 g/cm$^3$.

12 Claims, No Drawings

METHOD OF MAKING POROUS SILICON CARBIDE BODIES

This application is a continuation of application Ser. No. 352,006 filed Feb. 24, 1982 now abandoned.

This invention concerns the manufacture of porous silicon carbide plates and other articles such as are useful for filtration of hot gases and corrosive liquids and also as porous carriers for catalysts, as well as for other purposes. A method of making porous silicon carbide was disclosed as early as 1961 in U.S. Pat. No. 3,100,688. As there described, a mixture of carbon and elementary silicon powder in a definite ratio to each other was produced and then converted with hydrofluoric acid. By the reaction between silicon and hydrofluoric acid, generation of gas takes place in the material which then is blown up into a kind of foam. The "solid foam" thus formed is then dried and is heated up to 1400° C. in two hours and then held at 1400° C. for one hour. The temperature is then at first raised to 1500° C. for half an hour, kept there for one hour, and finally raised in the next half hour to 1850° C.

The manufacture of porous silicon carbide according to this method has two difficulties. In the first place, the handling of the treatment with hydrofluoric acid is not only dangerous and damaging to health, but requires costly apparatus in order to counteract its etching effect. In the second place, the heat treatment is complicated and uneconomic in the operation of the oven because it requires going repeatedly from room temperature up to very high temperatures.

THE INVENTION

It is an object of the present invention to provide a method for making porous silicon carbide that is less subject to dangers and leads in a relatively simple and controllable way to excellently usable articles.

Briefly, starting with a carbon powder or a carbon and silicon carbide mixed powder of uniform particle size range, in either case provided with an organic binder capable of being coked, a precursor body is pressed, treated with heat between 40° and 200° C. for driving off volatile components and is then coked at temperatures up to 850° C. The body thus obtained is then siliconized in either of two ways. In a first embodiment of the method, it is heated between 1650° and 1950° C. in the presence of gaseous silicon. In a second embodiment of the method, it is dipped into molten silicon for impregnation with silicon and chemical conversion, after which the remaining elemental silicon is vaporized out or removed by boiling in lye. The particle size range for the powder of carbon or of carbon and silicon carbide for manufacture of the precursor body in accordance with the invention is not less than 50 $\mu$m and is preferably in accordance with the invention constituted just one of the following fractions determined by the sieve mesh dimensions:

53 to 105 $\mu$m grain size;
105 to 150 $\mu$m grain size;
150 to 300 $\mu$m grain size;
300 to 600 $\mu$m grain size, or
600 to 1000 $\mu$m grain size.

The use of starting powders of a particular sieve mesh fraction selected from one of the above for manufacture of porous bodies is, indeed, not unknown in the manufacture of metal filters, but in that case the powders in question were of the same material that would appear in the final product. In accordance with the invention, however, a porous body is manufactured consisting essentially of only one component (C) of the filter material to be produced, this component making up only 25 to 30% by weight of the filter as completely manufactured. Subsequently the other component (Si) of the filter material is infiltrated and reacted, this other component making up an addition of 70 to 75% by weight. Inspite of this large mass increase the porous structure of the body can be retained. This could not be predicted or expected.

For the making up of the precursor body, carbon powders are, in particular, used that have a structure that is not absolutely compact. Thus, petroleum coke, electrographite, wood charcoal and the like are used, with or without a moderate admixture of silicon carbide, and this material is then mixed with about 15 to 30% of a binder, and especially about 20% thereof, the binder being typically pitch, tar, phenolformaldehyde resin, sugar solution, soluble cellulose, starches, wax emulsion, polyvinyl alcohol mixtures and the like. The binder is distributed as uniformly as possible over the particle mass, as can be provided, for example, by a fluidized bed process. Then plates, sleeves, shelves or the like, are pressed out of this powder mass. When silicon carbide of the same powder particle size is mixed into the material, its component can contribute up to 70% of the powder by weight with good results, but preferably only about 50% SiC or less should be used.

The pressed bodies are "dried" at between 40 and 200%C according to the nature of the binder that is used. By "drying" is meant a heat treatment just about sufficient for driving out volatile components. Thereafter they are coked at temperatures up to 850° C., preferably at a heating up velocity of about 5° C. per minute.

The precurser body obtained in this way from the starting material of a unitary grain size fraction has a density from about 0.5 to about 0.9 g/cm$^3$, typically between 0.6 and 0.7 g/cm$^3$. This body is then treated for conversion of the carbon component into silicon carbide in the temperature range of 1450° to 2100° C. by contact with gaseous or liquid silicon. Porous silicon carbide is formed in the case of gas phase siliconizing between 1650° and 1950° C., and the product can be directly sluiced out of the oven. If the precurser body is dipped into a silicon melt, the molten silicon not only reacts with the carbon but fills all the pores that are available. In order to restore the porosity, the silicon is then vaporized out of the SiC-Si body at 1900° to 2100° C. for 0.5 to 2 hours, or the silicon is removed by boiling for two to eight hours in lye, preferably soda-lye.

EXAMPLE 1

A porous plate 10 mm thick was produced using as the filler particles for the binder-filler mixture of the starting material particles of electrographite of a sieve fraction extending in particle size from 105 to 150 $\mu$m. The binder used was distributed in the mass by a fluidized bed process. The material thus prepared was then pressed in the shape of the plate. The density of the plate thus obtained was 0.6 g·cm$^{-3}$. The plate was heated for two hours in a silicon gas atmosphere at 1850° C., cooled and weighed. The density had then reached a value of 2.00 g·cm$^{-3}$. The throughput capability of the plate for air at room temperature under 7 bar of forward pressure was 3.5 m$^3$/cm$^2$·h.

EXAMPLE 2

A plate was similarly made with a thickness of 5 mm with a filler particle fraction extending in grain size from 53 to 105 μm which, after pressing, had a density of 0.7 g·cm$^{-3}$. This plate was then subjected to gas phase siliconizing at 1850° C. After a reaction period of two hours, the plate density reached a value of 2.33 g·cm$^{-3}$. The throughput capability of the plate for air at room temperature under 7 bar forward pressure lay at 1.5 m$^3$/cm$^2$·h.

EXAMPLE 3

In a similar way a porous plate 5 mm thick was made using electrographite and α silicon carbide as the filler particles, using a sieve fraction range from 150 to 300 μm for the particles. The plate as pressed was siliconized by immersion in molten silicon at 1750° C. for ten minutes, then removed from the bath and heated at 2000° C. for 1.5 hours. The plate so made had a density of 2.30 g·cm$^{-3}$ and had a throughput capability under the conditions given in Example 1 which was about 2.3 m$^3$/cm$^2$·h.

EXAMPLE 4

A sleeve was made in a similar manner, with petroleum coke and α silicon carbide as the filler particles, in the "mesh" range from 300 to 600 μm, and was impregnated with molten silicon at 1800° C. After a ten minute reaction period, the sleeve was boiled for eight hours in 10% NaOH solution. The density of the sleeve so made was 2.5 g·cm$^{-3}$ and the throughput capability of the sleeve through its walls was 4.5 m$^3$/cm$^2$·h.

EXAMPLE 5

A pattern piece having a wall thickness of 8 mm was similarly made using vegetable carbon, pitch coke and silicon carbide, the filler particles having a particle size in the sieve mesh range from 600 to 1000 μm. As pressed, this article had a density of 1.5 g·cm$^{-3}$. After siliconizing for ten minutes in molten silicon at 1650° C. and the boiling in 10% sodium hydroxide solution for four hours, an article of a density of 2.4 g·cm$^{-3}$ and a throughput capability of 4.0 m$^3$/cm$^2$·h was obtained.

Although the invention has been described with reference to particular illustrative examples, it will be understood that further variations and modifications are possible within the inventive concept.

We claim:

1. Method of producing porous silicon carbide bodies comprising the steps of:
   preparing a carbon precursor body having a density between 0.5 and 0.9 g/cm$^3$ by the substeps of:
   mixing a cokable organic binder with a carbon powder of a minimum grain size not less than 50 μm and having a degree of uniformity of grain size such that the maximum grain size is not more than twice the minimum grain size, said binder providing between 15 and 30% by weight of the mixture;
   pressing said mixture to form a precursor body;
   heating said precursor body to drive off volatile components at a temperature between 40° and 200° C.; and
   further heating said precursor body up to 850° C. and thereby coking said binder; and
   heating said precursor body in contact with gaseous silicon at a temperature between 1650° and 1950° C. to convert the material of said body substantially to porous silicon carbide.

2. Method as defined in claim 1, in which the density of said carbon body after coking is in the range from 0.6 to 0.7 g/cm$^3$.

3. Method as defined in claim 1, in which said binder content of said powder material mixture is approximately 20% by weight.

4. Method of producing porous silicon carbide bodies comprising the steps of:
   preparing a carbon precursor body having a density between 0.5 and 0.9 g/cm$^3$ by the substeps of
   mixing a cokable organic binder with a carbon powder consisting essentially of carbon and of a minimum grain size not less than 50 μm and having a degree of uniformity of grain size such that the maximum grain size is not more than twice the minimum grain size, said binder providing between 15 and 30% by weight of the mixtures;
   pressing said mixture to form a precursor body;
   heating said precursor body to drive off volatile components at a temperature between 40° and 200° C., and
   further heating said precursor body up to 850° C. and thereby coking said binder;
   thereafter dipping said carbon body in a silicon melt and thereby impregnating it with silicon and converting the carbon in said body substantially into silicon carbide, and
   removing the remainder of uncombined silicon from said body.

5. Method as defined in claim 4, in which the step of removing the remaining uncombined silicon is performed by vaporizing the uncombined silicon remainder.

6. Method as defined in claim 4, in which the step of removing the uncombined silicon remainder is performed by boiling in lye.

7. Method as defined in claim 4, 5, or 6, in which said carbon powder is a powder selected from the group consisting of electrographite powder, petroleum coke powder, charcoal powder from wood or vegetable matter and mixtures of two or more of the foregoing.

8. Method as defined in claim 7, in which said powder is of a particle size of which the upper particle size limit is not greater than 1000 μm.

9. Method as defined in claim 8, in which the grains of said powder are of sizes not less than 105 μm and not more than 150 μm.

10. Method as defined in claim 8, in which the grains of said powder of sizes is not less than 600 μm and not more than 1000 μm.

11. Method of producing porous silicon carbide bodies comprising the steps of:
    preparing a carbon-containing precursor body having a density of approximately 1.5 g/cm$^3$ by the substeps of
    mixing a cokable organic binder with a powder consisting of not more than 70% by weight of silicon carbide powder and the remainder of carbon powder, said powder having a minimum grain size not less than 50 μm and having a degree of uniformity of grain size such that the maximum grain size is not more than twice the minimum grain size, said binder providing between 15 and 30% by weight of the mixture;
    pressing said mixture to form a precursor body;

heating said precursor body to drive off volatile components at a temperature between 40° and 200° C.; and further heating said precursor body up to 850° C. and thereby coking said binder; and thereafter heating the precursor body so prepared in contact with gaseous silicon at a temperature between 1650° and 1950° C. to convert the material of said body substantially to porous silicon carbide.

12. Method of producing porous silicon carbide bodies comprising the steps of:

preparing a carbon-containing precursor body having a density of approximately 1.5 g/cm$^3$ by the substeps of mixing a cokable organic binder with a powder consisting of not more than 70% by weight of silicon carbide powder and the remainder of carbon powder, said powder having a minimum grain size not less than 50 $\mu$m and having a degree of uniformity of grain size such that the maximum grain size is not more than twice the minimum grain size, said binder providing between 15 and 30% by weight of the mixture;

pressing said mixture to form a precursor body;

heating said precursor body to drive off volatile components at a temperature between 40° and 200° C.; and further heating said precursor body up to 850° C. and thereby coking said binder; and thereafter dipping the body so prepared in a silicon melt and thereby impregnating it with silicon and converting the carbon in said body substantially into silicon carbide, and removing the remainder of uncombined silicon from said body.

* * * * *